US010554726B1

(12) United States Patent
Mattison

(10) Patent No.: US 10,554,726 B1
(45) Date of Patent: Feb. 4, 2020

(54) REMOTE DEVICE DRIVERS FOR INTERNET-CONNECTABLE DEVICES

(71) Applicant: Amazon Technologies, Inc., Seattle, WA (US)

(72) Inventor: Timothy Mattison, Mount Kisco, NY (US)

(73) Assignee: Amazon Technologies, Inc., Seattle, WA (US)

( * ) Notice: Subject to any disclaimer, the term of this patent is extended or adjusted under 35 U.S.C. 154(b) by 314 days.

(21) Appl. No.: 15/466,744

(22) Filed: Mar. 22, 2017

(51) Int. Cl.
*H04L 29/08* (2006.01)
*G06F 13/00* (2006.01)
*G06F 9/54* (2006.01)

(52) U.S. Cl.
CPC ............ *H04L 67/025* (2013.01); *G06F 9/542* (2013.01); *H04L 67/36* (2013.01); *G06F 2209/544* (2013.01)

(58) Field of Classification Search
CPC ........... H04L 41/0213; H04L 29/08072; H04L 29/06; H04L 41/22; H04L 41/12; H04L 67/025; H04L 67/36; H04L 12/2803; H04L 67/125; H04L 43/045; G06F 9/542; G06F 2209/544
See application file for complete search history.

(56) References Cited

U.S. PATENT DOCUMENTS

| 2008/0065766 | A1* | 3/2008 | Motoyama | H04L 43/067 709/224 |
| 2010/0262269 | A1 | 10/2010 | Gladwin et al. | |
| 2011/0030487 | A1* | 2/2011 | McRae | G05G 1/38 74/89.2 |
| 2013/0063767 | A1* | 3/2013 | Morris | G06F 3/1206 358/1.15 |
| 2014/0181891 | A1* | 6/2014 | Von Bokern | H04L 63/20 726/1 |

(Continued)

OTHER PUBLICATIONS

U.S. Appl. No. 15/666,491, filed Aug. 1, 2017, Adolfo Bravo Ferreira.

(Continued)

*Primary Examiner* — Abdullahi E Salad
(74) *Attorney, Agent, or Firm* — Robert C. Kowert; Kowert, Hood, Munyon, Rankin & Goetzel, P.C.

(57) ABSTRACT

A device driver assignment service registers, in an event-driven compute service, device driver functions for respective IoT devices. The event-driven compute service receives a network protocol message that includes an identifier for an IoT device and an instruction for the IoT device. In response to determining that the network protocol message matches a defined event to trigger a registered device driver function, the event-driven compute service launches the registered device driver function. The registered device driver function translates the instruction into a device driver hardware command for a hardware device corresponding to the IoT device (e.g., within the IoT device). The registered device driver function then transmits, to the IoT device, another network protocol message that includes the device driver hardware command. The IoT device receives the other network protocol message, parses the message to obtain the device driver hardware command, and performs the command on the hardware device.

20 Claims, 10 Drawing Sheets

(56) References Cited

U.S. PATENT DOCUMENTS

| | | | |
|---|---|---|---|
| 2014/0330959 A1* | 11/2014 | Zhang | H04L 12/2803 |
| | | | 709/224 |
| 2016/0182629 A1 | 6/2016 | Korn | |
| 2016/0315922 A1* | 10/2016 | Chew | H04L 63/061 |
| 2018/0018081 A1* | 1/2018 | Dattilo-Green | H04L 67/025 |
| 2018/0034913 A1* | 2/2018 | Matthieu | H04L 67/125 |

OTHER PUBLICATIONS

U.S. Appl. No. 16/255,128, filed Jan. 23, 2019, Lomash Kumar et al.

* cited by examiner

US 10,554,726 B1

REMOTE DEVICE DRIVERS FOR INTERNET-CONNECTABLE DEVICES

BACKGROUND

With the increased availability of different smart devices that access the internet, many new applications have been developed that leverage internet connectivity. The Internet of Things (IoT) is a phrase given for the interconnection of computing devices scattered around the globe within the existing internet infrastructure. IoT devices may be embedded in a variety of products, such as home appliances, manufacturing devices, printers, automobiles, thermostats, smart traffic lights, etc. Many IoT devices make use of a connection with a server of a remote service provider in order to send data from the server to the IoT device and from the IoT device to the server whenever data needs to be transmitted (e.g., publish-subscribe communication).

In some cases, a user may remotely control various functions of an IoT device. For example, a user may use an application on a smart phone that communicates with the remote service provider in order to cause an IoT device to activate a sprinkler system. The same user may also have another application that can be used in conjunction with the remote service provider in order to obtain temperature measurements from a thermostat IoT device.

Embedded development of IoT devices often requires reimplementation of existing protocols as products move from one hardware platform to another. This is often necessary due to different operating systems, processors, pin configuration, and other factors. Performing such a reimplementation may consume a large amount of developer time and steal resources away from other work projects. Moreover, systems may become exposed to new bugs and new security issues. Adding new protocols to devices in the field may introduce additional problems that result in additional costs. For example, re-flashing a device might "brick" the device.

Figure 1:
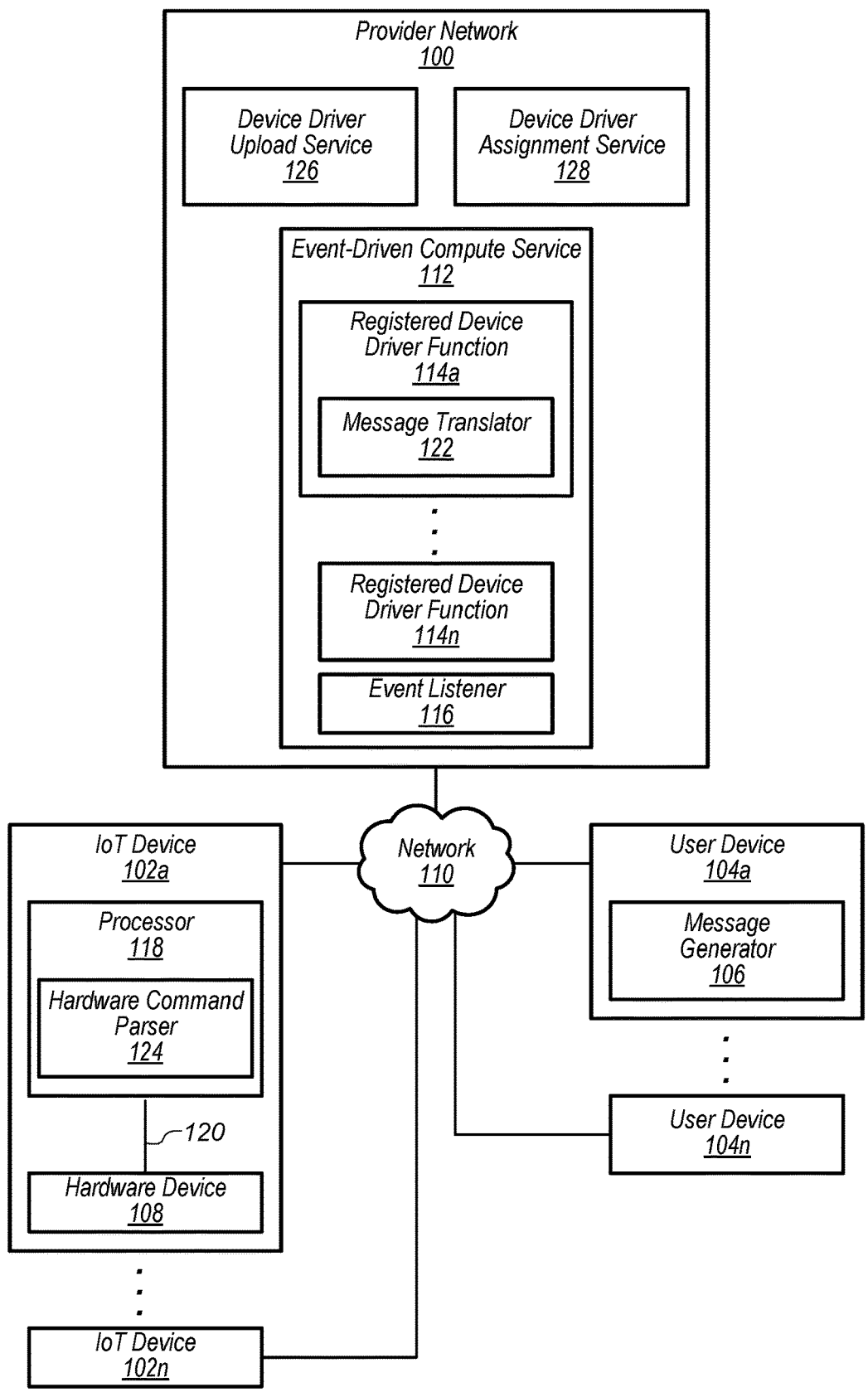
FIG. 1 illustrates a system for using remote device driver functions for IoT devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement remote device drivers for internet-connectable devices (e.g., IoT devices). In embodiments, a provider network includes a device driver upload service that allows IoT device suppliers to upload device driver functions to the provider network. The provider network may also include a device driver assignment service that allows users to assign device driver functions to IoT devices. The provider network may also include an event-driven compute service that can receive from a user a message that includes an instruction, translate the instruction to a device driver hardware command, and generate another network protocol message that includes the device driver hardware command. The other network protocol message may then be transmitted to the IoT device in order to perform the device driver hardware command on a hardware device.

In embodiments, the device driver assignment service may register, in the event-driven compute service, device driver functions for respective IoT devices. The event-driven compute service may receive, via an application-level network protocol (e.g., message queue telemetry transport (MQTT), hyper-text transfer protocol (HTTP), or any other application layer protocol used for internet or network communication), a network protocol message from a user device. The network protocol message may include an identifier for the IoT device and/or an instruction for the IoT device. As used herein, an application level network protocol may be MQTT, HTTP, or any other application layer protocol suitable for internet or network communication and a network protocol message may be transmitted in accordance with any of the above application level network protocols. As used herein, launching a function may mean to execute a function or to being executing a function.

In embodiments, the event-driven compute service may determine that a network protocol message is associated with a defined event for a registered device driver function and in response, launch the registered device driver function. For example, in some embodiments, the event-driven compute service may determine whether the received network protocol message (or at least a portion of the message) matches a defined event to trigger (e.g., launch or execute) one of the registered device driver functions. In embodiments, to determine whether the message matches the defined event, the event-driven compute service determines whether the message or one or more portions of the message map to the defined event. In various embodiments, any number of ways may be used to determine a match (e.g., the match may be based on one or more portions (e.g., identifier and/or instruction) of the message). In response to determining that the network protocol message matches a defined event to trigger the registered device driver function, the event-driven compute service may launch (e.g., execute) the registered device driver function.

In embodiments, the registered device driver function may translate the instruction into a device driver hardware command for a hardware device corresponding to the IoT device (e.g., within the IoT device and/or communicatively coupled to the IoT device). The registered device driver function may then transmit, to the IoT device via an application-level network protocol, another network protocol message that includes the device driver hardware command. The IoT device may receive the other network protocol message, parse the message to obtain the device driver hardware command, and perform the command on the hardware device. For example, the IoT device may cause a screen to display message indicated by the command or may activate a sprinkler system indicated by the hardware command.

In various embodiments, a network-based service may instead perform some or all of the actions described with respect to the event-driven compute service. The network-based service may be a server-based hosting service that is hosted by one or more server computers. Thus, in embodiments, the network-based service may receive a network protocol message. The network protocol message may include an identifier for an IoT device and/or an instruction for the IoT device and/or other data. The network-based service may identify a device driver function associated with the received network protocol message, wherein the device driver function is registered in the network-based service. In embodiments, any number of other device driver functions may also be registered. In response, the network-based service may then execute the identified device driver function. The function may translate the instruction into a device driver hardware command for a hardware device corresponding to the IoT device, transmit to the IoT device another protocol message that includes the device driver command, and/or perform any other actions as described for a registered device driver function of an event-driven compute service.

In some embodiments, the client user device and/or the client IoT device is unaware of aspects of the event-driven compute service and/or how the event-driven compute service is implemented. For example, to implement a given registered device driver function, the event-driven compute service may execute code on one or more computing devices of the provider network, wherein the user device and/or the IoT device is unaware of the identity and/or network address of the one or more computing devices executing the code. Thus, in embodiments, the registered cache function may be executed in response to events without a client of the service having to manage, own, or run a fleet of dedicated servers to execute code on (thus enabling a "server-less" service). When not responding to an event, the event-driven compute service may consume no or relatively few computing resources, which may reduce the amount of computing resources consumed by the provider network to provide the service (e.g., CPU processing, memory, storage, network bandwidth, power consumption, etc.).

Techniques for implementing remote device drivers for IoT devices may provide other benefits as well. In some embodiments, some or all of the functionality provided by a device driver for an IoT device is provided by a corresponding device driver function for the IoT device. Thus, one or more versions of a device driver may be easily shared across different IoT device architectures and/or different IoT device operating systems. In some embodiments, a device driver may be updated remotely and in different programming languages (e.g., by updating the corresponding device driver function). Thus, developer communities can easily create and manage device driver functions.

In embodiments, the size of the operating system and other code of the IoT device may be reduced in size relative to traditional devices because the operating system and other code is not required to perform device driver functionality that is performed by the provider network. Instead of implementing new protocols in IoT device firmware, the new protocols may be implemented by the provider network. Moving device driver functionality off the IoT device and to the provider network may provide many benefits. For example, a minimally-sized operating system and code may be used on the IoT device, resulting in less consumption of computing resources, faster implementation of device driver commands that are received from the provider network, and reduced power consumption.

By modifying code for device driver functions, developers with little or no embedded programming experience may extend device drivers to add additional and/or higher level functionality. By leveraging device driver functions, a device driver may be implemented for an IoT device by following a data sheet or specifications for a particular processor and/or hardware device corresponding to the IoT device with little or no knowledge of specific details (e.g., technical parameters) of the particular processor and/or hardware device.

FIG. 1 illustrates a system for using remote device driver functions for IoT devices, according to some embodiments. The provider network 100, the IoT devices 102a-102n, the user devices 104a-104n and any other components depicted in FIG. 1 may be the same (or have one or more same components) as the provider network, IoT devices, user devices, and other components depicted in any of FIGS. 2-11, in embodiments. Similarly, the provider network, IoT devices, user devices, and other components depicted in any of FIGS. 2-11 may be the same (or have one or more same components) as the provider network 100, the IoT devices 102a-102n, the user devices 104a-104n and any other components depicted in FIG. 1.

In embodiments, some or all of the user devices 104 may include the same components and perform the same functions as the user device 104a. Similarly, in various embodiments, some or all of the IoT devices 102 may include the same components and perform the same functions as the IoT device 102a.

In the depicted embodiment, the user device 104a includes a message generator 106 that may generate a network protocol message that includes an instruction for the IoT device 102a. The instruction may be provided to the user device 104a via user input. For example, an input device such as a keyboard, mouse, microphone, or any other suitable input device may be used to provide the instruction to the IoT device 102a.

In embodiments, after the instruction is provided to the user device 104a, the user device 104a may format and/or modify the instruction. The user device 104a may generate a network protocol message that includes the instruction and transmit the network protocol message via an application-level network protocol to the provider network 100 via a network 110 (e.g., wide-area network, internet, etc.). In some embodiments, another computing device may receive the instruction from the user device 104a, generate the network protocol message that includes the instruction, and transmit the network protocol message to the provider network 100 as described above.

In some embodiments, the network protocol message and/or the instruction may include an identifier for the IoT device 102a. The identifier may be unique to the IoT device 102a and/or unique relative to one or more other identifiers for other IoT devices 102 such that the IoT device 102a may be uniquely identified by the identifier.

In embodiments, an event-drive compute service 112 receives the network protocol message that was sent from the user device 104a. The event-drive compute service 112 and/or an event listener 116 of the event-drive compute service 112 may determine whether the received network protocol message matches a defined event to trigger one of the registered device driver functions 114 of the event-drive compute service 112. In embodiments, the defined event may include receiving a given network protocol message that includes the identifier for the IoT device 102a and/or the instruction in the network protocol message.

In response to determining, by the event-drive compute service 112 and/or the event listener 116 that the network protocol message matches a defined event to trigger the registered device driver function 114a, the event-driven compute service 112 may launch the registered device driver function 114a. For example, the event-driven compute service 112 may initiate execution of code of the registered device driver function 114a such that the registered device driver function 114a is actively running. As used herein, "launching" a function is executing a function (or code of the function), so that the function is an actively running function. In some embodiments, if the network protocol message does not match a defined event to trigger the registered device driver function 114a, the event-drive compute service 112 may return a message to the user device 104a that indicates the message and/or the instruction was invalid.

In embodiments, the actively running registered device driver function 114a translates the instruction into a device driver hardware command for the hardware device 108 corresponding to the IoT device 102a. In some embodiments, the registered device driver function 114a may first parse the received network protocol message to obtain the instruction. For example, the registered device driver function 114a may extract the instruction from the network protocol message by removing one or more portions of the message that do not include the instruction. In some embodiments, the registered device driver function 114a may identify the instruction within the message and save the identified instruction separately from the message.

In various embodiments, the registered device driver function 114a may determine whether the IoT device 102a is capable of implementing the instruction and/or the device driver hardware command and if not, the function 114a may terminate and/or return a message to the user device 104a indicating an invalid instruction, without transmitting a message and/or the device driver hardware command to the IoT device 102a (if so, the function 114a will continue running as described below). For example, in embodiments, the registered device driver function 114a may determine that the IoT device 102a does not have the version of the processor 118 and/or the version of the hardware device 108 (e.g., the version of the hardware device 108 is not attached or communicatively coupled to the IoT device 102a) required to implement the instruction and/or the device driver hardware command. In response, the function 114a may terminate and/or return a message to the user device 104a indicating an invalid instruction, without transmitting a message and/or the device driver hardware command to the IoT device 102a (if so, the function 114a will continue running as described below).

In some embodiments, to translate the instruction into a device driver hardware command for the hardware device 108, the registered device driver function 114a may modify, delete, and/or replace one or more portions of the instruction. In embodiments, the resulting device driver hardware command may include data that identifies one or more (or all) hardware resources of the IoT device 102a that are necessary to cause the hardware device 108 to perform the hardware command and/or implement the desired function or the desired action indicated by the instruction. Thus, in embodiments, the instruction received from the user device 104a does not identify at least the one or more hardware resources of the IoT device 102a that are necessary to cause the hardware device 108 to perform the desired function or the desired action. In embodiments, the IoT device 102a does not have a device driver for translating the instruction into the device driver hardware command for the hardware device 108.

In embodiments, the one or more hardware resources of the IoT device 102a identified by the device driver hardware command include one or more pins corresponding to a processor 118 of the IoT device 102a that are used to implement the device driver hardware command for the hardware device 108. In some embodiments, the one or more pins are electrically coupled to one or more corresponding pins or other hardware resources of the hardware device 108 via a bus 120 (e.g., one or more electrically conductive paths/wires). For example, four pins may be coupled to four corresponding pins or other hardware resources of the hardware device 108 via a bus that includes four electrically conductive paths.

In some embodiments, different registered device driver functions may generate and transmit different respective device driver hardware commands that identify different pins and/or a different number of pins for different respective IoT devices and/or different versions of a particular IoT device. In embodiments, two different versions of a particular IoT device may include the same processor or the same version of a processor but have different hardware devices or different versions of a hardware device, so a different device driver function may be stored and/or registered for each version of the IoT device. In some embodiments, two different versions of a particular IoT device may include different processors or different versions of a processor but have the same hardware device or the same version of a hardware device, also resulting in two different device driver functions. In some embodiments, two different versions of a particular IoT device may include different processors or different versions of a processor as well as different hardware devices or different versions of a hardware device, also resulting in two different device driver functions. Thus, any hardware and/or firmware differences between two or more different versions of an IoT device (e.g., different host board, different peripherals, different hardware devices, different processors, different memory, different buses) may result in two or more corresponding device driver functions that are different (and corresponding different device driver hardware commands).

In embodiments, to translate the instruction into the device driver hardware command for the hardware device 108, the registered device driver function 114a may add an identification of a hardware communication protocol (e.g., bus communication protocol) to the hardware command that indicates the hardware communication protocol to use with the hardware device. Thus, the processor 118 may perform the device driver hardware command on the hardware device 108 in accordance with the identified hardware communication protocol. Any suitable protocol for performing a device driver hardware command may be used, including inter-integrated circuit (I2C), serial peripheral interface (SPI), universal asynchronous receiver/transmitter (UART), controller area network (CAN), and even transmission control protocol (TCP) and/or user datagram protocol (UDP) networking protocols. In some embodiments, a high-level instruction or communication protocol (e.g., use an organic light emitting diode (OLED) display) may be translated, through one or more steps, into lower-level hardware communication protocols until it is translated into the hardware command that indicates the low-level communication protocol (e.g., I2C communication protocol).

In some embodiments, the one or more hardware resources of the IoT device 102a identified by the device driver hardware command include one or more resources within the processor 118 of the IoT device or within another microchip or processor of the IoT device. For example, the device driver hardware command may identify one or more registers or one or more bits and/or values for the one or more registers or one or more bits (e.g., to configure the IoT device). In embodiments, the device driver hardware command may identify configuration-related or security-related hardware resources within the processor 118 or IoT device, such as a trusted platform module (TPM), along with one or more values to be provided to the identify configuration-related or security-related hardware resources. Thus, in embodiments, a particular registered hardware device driver function may be used to send a device driver hardware command to the IoT device to initialize and/or configure the IoT device for operation.

In various embodiments, the registered device driver function 114a includes a message translator 122a that performs some or all of the translation of the network protocol message that includes the instruction into another network protocol message that includes the device driver hardware command. In some instances, some or all of the registered device driver functions 114 may include the same components and perform the same functions as the registered device driver function 114a. In some embodiments, the registered device driver function 114a and/or the message translator 122a may transmit, via an application-level protocol, to the IoT device 102a the other network protocol message that includes the device driver hardware command.

In some embodiments, the IoT device 102a includes a hardware command parser 124 that receives the other network protocol message that includes the device driver hardware command. The hardware command parser 124 may parse the other network protocol message to obtain the device driver hardware command. Parsing may include any suitable technique for extracting and obtaining the device driver hardware command form the message, include those described above. In embodiments, the processor 118 includes and/or executes the hardware command parser 124. However, in some instances, some or all of the hardware command parser 124 may be executed external to the processor 118 (e.g., in an external memory and/or other processor).

After the processor 118 and/or the hardware command parser 124 obtains the device driver hardware command, it may be performed on the hardware device 108. Any suitable technique for performing the device driver hardware command via the bus 120 may be implemented. For example, one or more electrical signals may be applied to one or more corresponding pins of the processor 118. In embodiments, a voltage and/or current may be applied to one or more of the pins to perform the command on the hardware device via the bus 120. In some embodiments, one or more of the pins of the processor 118 may be electrically coupled to one or more corresponding pins of the hardware device 108. As described above, any suitable hardware communication protocol may be used to implement the command on the hardware device 108.

In embodiments, before a given device driver function may be registered for use with a given IoT device, the device driver function must first be created and stored in the event-driven compute service 112 and then assigned to the IoT device. As depicted, the provider network 100 includes a device driver upload service 126 used by suppliers of IoT devices and a device driver assignment service 128 used by users of IoT devices.

A supplier may provide (e.g., via a client computer connected to the network 100) device driver functions for one or more respective versions for each of one or more IoT devices to the device driver upload service 126. In embodiments, a version of a hardware device may correspond to a version of an IoT device and a different version of the hardware device ma correspond to a different version of the IoT device. The device driver upload service 126 may then store the device driver functions in the event-driven compute service 112. In embodiments, a unique identifier is assigned to each of the device driver functions. For example, each identifier may be stored in association with the corresponding function. In some embodiments, the supplier may provide device driver data and the device driver upload service translates and/or formats the device driver data to generate the device driver function that corresponds to the device driver data.

In some embodiments, a user provides to the device driver assignment service 128 (e.g., via a user device 104) an indication of which device driver function stored in the event-driven compute service is to be assigned to a particular IoT device. For example, a user may use the device driver assignment service 128 to register, in the event-driven compute service, a device driver function to create the registered device driver function 114*a* for the IoT device 102*a*.

In various embodiments, the device driver assignment service 128 may receive, from a user device, a request to register a particular IoT device. The request may include identification data for the particular IoT device or the type of the particular IoT device. In response, the device driver assignment service 128 may select a particular device driver function from a plurality of device driver functions stored in the event-driven compute service based on the identification data. For example, the device driver assignment service 128 may determine, based on a data store of the provider network, that the particular IoT device or the type of the particular IoT device corresponds to the particular device driver function. In response, the device driver assignment service 128 may select the particular device driver function. The device driver assignment service 128 may then register the particular device driver function in the event-driven compute service as the registered device driver function for the particular IoT device.

In embodiments, to register a device driver function as the registered device driver function 114*a* for the IoT device 102*a*, the device driver assignment service 128 may define one or more events that trigger the registered device driver function 114*a* in the event-driven compute service 112. For example, an event may be or may include receiving a given network protocol message that comprises at least an identifier for the IoT device 102*a*. In embodiments, a user may define one or more of the events that trigger the function. In some embodiments, at least some of the events are pre-defined for the registered device driver function 114*a*.

In embodiments, the instruction sent from a user or user device may be any suitable data that indicates a desired function or a desired action for the IoT device 102*a* to perform and/or for the hardware device 108 to perform. For example, if the IoT device is a display device that includes a display screen, then the instruction may include the phrases "show message" and "Hello, world" to indicate a desired function for the display screen to display the message, "Hello, world." Thus, in embodiments, the instruction may include a command or functional portion (e.g., "show message") and a data portion (e.g., "Hello, world"). As another example, if the IoT device is a temperature sensing device, then the instruction may include the phrase "get current temperature" to indicate a desired function for the temperature sensing device to return data to the user device 104*a* that indicates a value for the current temperature.

In some embodiments, the MQTT protocol may be implemented to send various device driver hardware commands to IoT devices. For example, MQTT may be used to display the message, "Hello, world" on a display IoT device. The display IoT device may include a display that is connected to a processor (e.g., microcontroller) via including inter-integrated circuit (I2C). A user may send an MQTT message to the provider network (e.g., to the event-driven compute service) on the "device/display/OLED" topic that indicates the user wants to show the message. For example, the MQTT message may be {"show_message": "Hello, world"}.

In response to receiving the MQTT message, a registered device driver function may be triggered and launched. The function may translate the MQTT message into another MQTT message that indicates to the processor what pins to use (e.g., SCL 4, SDA 5), what hardware communication protocol to use (e.g., I2C, address 3e), and the actual bytes to send to the display. The new message may go out on the topic "device identifier/i2c/4/5/3e" and the MQTT message may be {"data": "[binary data for sending to the display]"}. The display IoT device may receive the message and send the data via I2C to the display according to the information provided in the MQTT topic. In embodiments, the registered device driver function may be updated and/or additional functionality may be added. For example, a user may send the MQTT message {"blink_message": "Hello, world"}, which may cause the registered device driver function to send a series of messages to the display IoT device that causes the display to show a message, remove the message, and show the message for a specified number of times.

Figure 2:
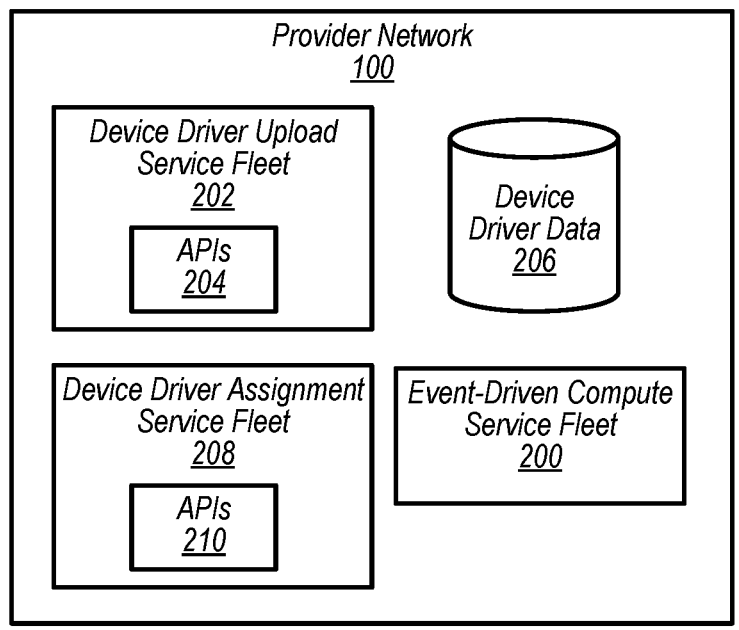
FIG. 2 is a block diagram illustrating example components of a provider network for configuring and implementing remote device driver functions for IoT devices, according to some embodiments.

FIG. 2 is a block diagram illustrating example components of a provider network for configuring and implementing remote device driver functions for IoT devices, according to some embodiments. In the depicted embodiment, the event-driven compute service fleet 200 includes a fleet of servers that implement registered device driver functions. In embodiments, the event-driven compute service fleet 200 may store data that is used to implement the functions, such as function code for various functions, function registration information, and function assignment information.

The provider network 100 also includes a device driver upload service fleet 202 of servers that provide management APIs 204 to receive device driver functions and/or device driver data from suppliers and to store the device driver functions and/or device driver data in the event-driven compute service. Thus, device driver upload service fleet 202 may implement the device driver upload service 126. In embodiments, some or all of the device driver functions and/or device driver data may be stored in device driver data 206. In embodiments, the device driver data 206 may be a data store (e.g., database, tables, etc.) accessible by client devices (e.g., supplier or user devices) as well as components of the provider network, such as the event-driven compute service 112, the device driver upload service 126, and the device driver assignment service 128.

The depicted provider network 100 also includes a device driver assignment service fleet 208 of servers that provide management APIs 210 to receive device driver assignments, registration requests, and any other information used to register device driver functions for IoT devices. Thus, device driver assignment service fleet 208 may implement the device driver assignment service 128. In embodiments, some or all of the assignment data and registration data for device driver functions of the event-driven compute service 112 may be stored in device driver data 206.

Figure 3:
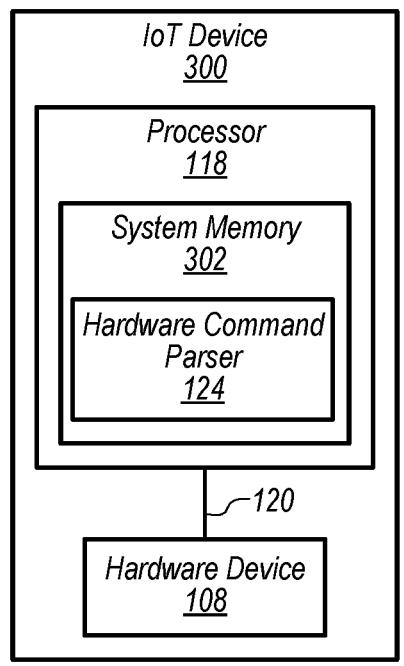
FIG. 3 is a block diagram of an example IoT device that implements a hardware command parser to obtain a device driver hardware command for a hardware device, according to some embodiments.

FIG. 3 is a block diagram of an example IoT device that implements a hardware command parser to obtain a device driver hardware command for a hardware device, according to some embodiments. In the depicted example, the IoT device 300 includes a processor 118 that implements a hardware command parser 124 in system memory 302 of the processor 118.

As described above, the processor 118 may parse a received network protocol message to obtain a device driver hardware command. The processor 118 may then implement the device driver hardware command on the hardware device 108. In embodiments, the processor 118 may implement the device driver hardware command via the bus 120 in accordance with a hardware communication protocol indicated by the device driver hardware command. Thus, in embodiments, some or all of the hardware device driver functionality that is typically or traditionally implemented by an IoT device to use a hardware device is instead implemented remotely by a provider network 100 (e.g., by the event-driven compute service 112).

Figure 4:
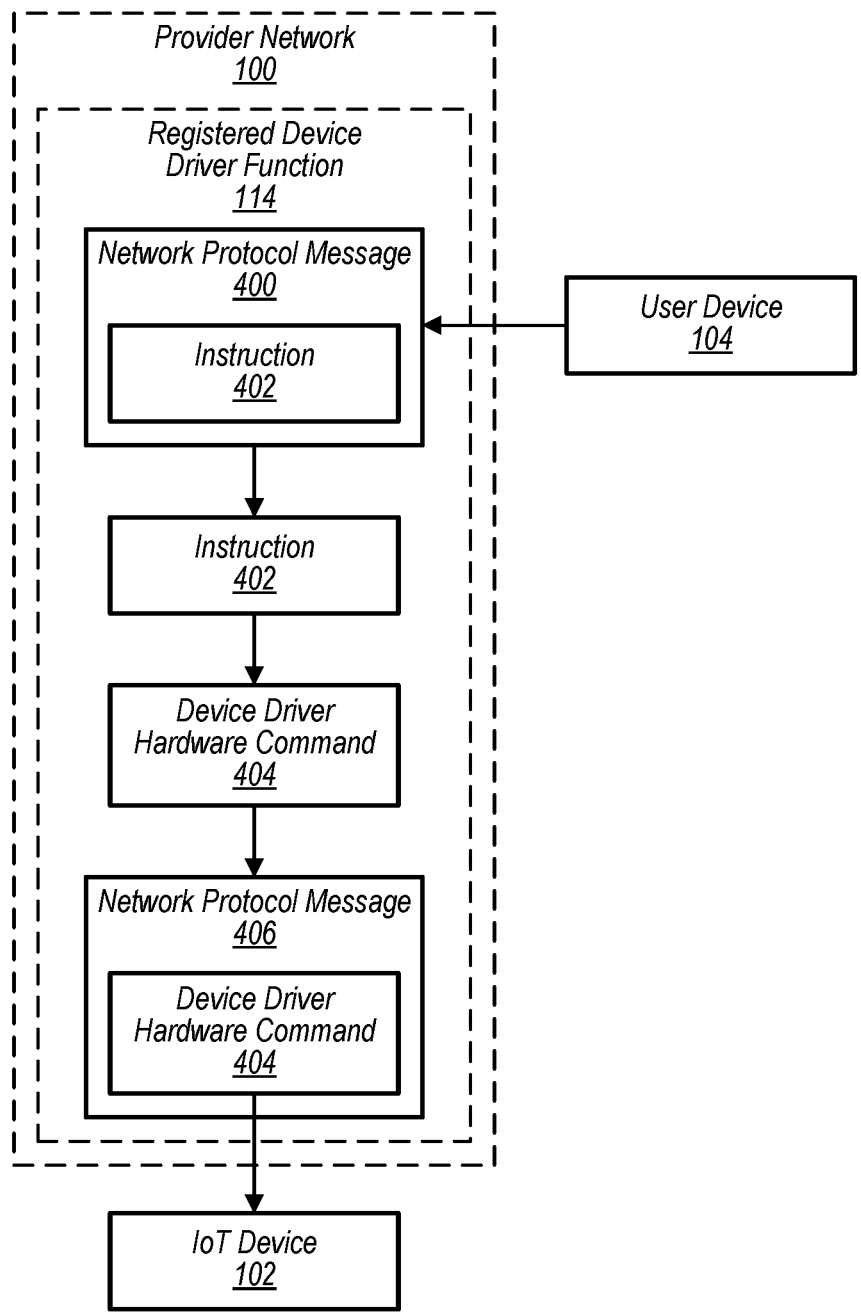
FIG. 4 is a logical block diagram of a registered device driver function that translates a network protocol message that includes an instruction into another network protocol message that includes a device driver hardware command for sending to an IoT device, according to some embodiments.

FIG. 4 is a logical block diagram of a registered device driver function that translates a network protocol message that includes an instruction into another network protocol message that includes a device driver hardware command for sending to an IoT device, according to some embodiments. In the depicted embodiment, an event-driven compute service of the provider network 100 receives a network protocol message 400 from a user device 104. The network protocol message 400 includes an instruction 402.

In response to determining that the network protocol message 400 matches a defined event to trigger the registered device driver function 114, the event-driven compute service may launch the registered device driver function 114. As shown, the registered device driver function 114 may receive the network protocol message 400 and parse the network protocol message 400 to obtain the instruction 402. The registered device driver function 114 may then translate the instruction 402 into a device driver hardware command 404 for a hardware device corresponding to an IoT device 102.

In some embodiments, the translation of the instruction 402 in to the device driver hardware command 404 may include performing any number of additional functions, steps, or iterations of translation. For example, a hierarchy of driver functions may be implemented to translate higher-level instructions to lower-level instructions before finally generating the device driver hardware command 404 for sending to the IoT device 102. For example, the instruction 402 may include the phrase, "hello, world," which may be translated by a driver function into lower-level pixel data, which is translated by another driver function into the device driver hardware command 404. In embodiments, one or more of the driver functions may be implemented by code within the registered driver function 114 and/or one or more of the driver functions may be implemented by a different registered driver function 114 that is called from the currently running registered device driver function.

In embodiments, the device driver hardware command 404 may include data that is necessary for the IoT device 102 and/or the processor 118 to implement the device driver hardware command 404. In some embodiments, some or all of the data necessary to implement the device driver hardware command 404 may not be included in the instruction 402 and/or the network protocol message 400 received from the user device 104. For example, the data necessary to implement the device driver hardware command 404 may include data that identifies one or more hardware resources of the IoT device 102 that are required to implement the device driver hardware command 404.

In some embodiments, the registered device driver function 114 generates a network protocol message 406 than includes the device driver hardware command 404. The registered device driver function 114 may then transmit, via an application-level network protocol (e.g., via the provider network 100 and/or the network 110), the network protocol message 406 to the IoT device 102. In various embodiments the application-level network protocol used for transmitting the network protocol message 406 may be the same or different than the application-level network protocol used for transmitting the network protocol message 400.

Figure 5:
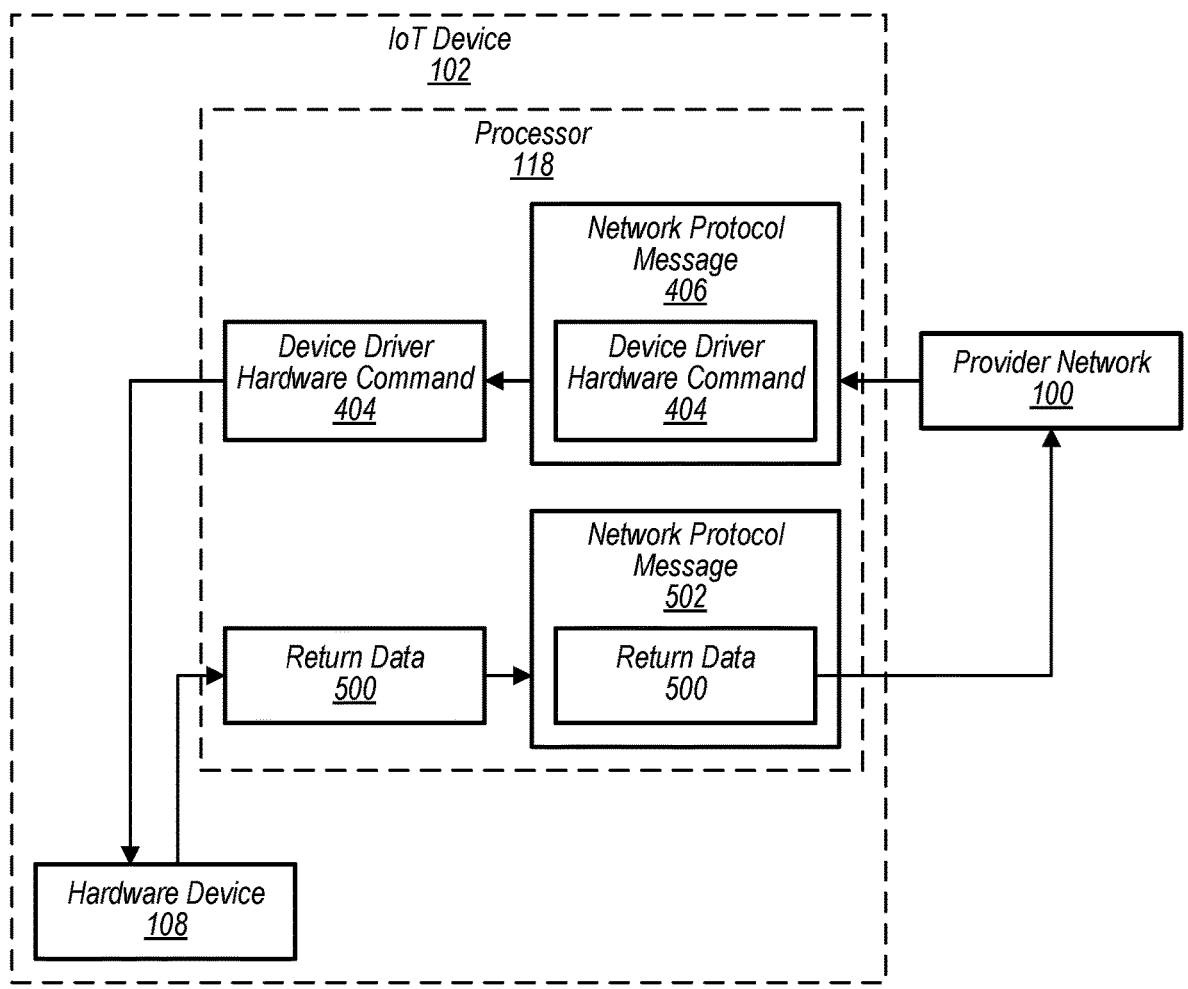
FIG. 5 is a logical block diagram of an IoT device that receives a network protocol message, obtains a device driver hardware command from the network protocol message, performs the hardware command on a hardware device, and returns to a provider network another network protocol message that includes return data, according to some embodiments.

FIG. 5 is a logical block diagram of an IoT device that receives a network protocol message, obtains a device driver hardware command from the network protocol message, performs the hardware command on a hardware device, and returns to a provider network another network protocol message that includes return data, according to some embodiments. In the depicted embodiment, a processor 118 of an IoT device 102 receives a network protocol message 406 from a registered device driver function 114 of a provider network 100. The network protocol message 406 includes a device driver hardware command 404.

In response to the network protocol message 406, the processor may implement a hardware command parser 124 to obtain the device driver hardware command 404. As shown, the processor 118 may then implement the device driver hardware command 404 on the hardware device 108. In response to implementing the device driver hardware command 404 on the hardware device 108, the hardware device 108 may generate return data 500. For example, if the IoT device 102 is a temperature sensing and reporting device, then the return data 500 may be data that indicates a particular temperature that was measured by a sensor of the hardware device 108 in response to receiving the device driver hardware command 404.

The processor 118 may receive the return data 500 and generate a network protocol message 502 that includes the return data 500. In embodiments, the processor 118 and/or the IoT device 102 may then transmit the network protocol message 502 to the provider network 100 via an application-level network protocol (e.g., via the network 110).

Figure 6:
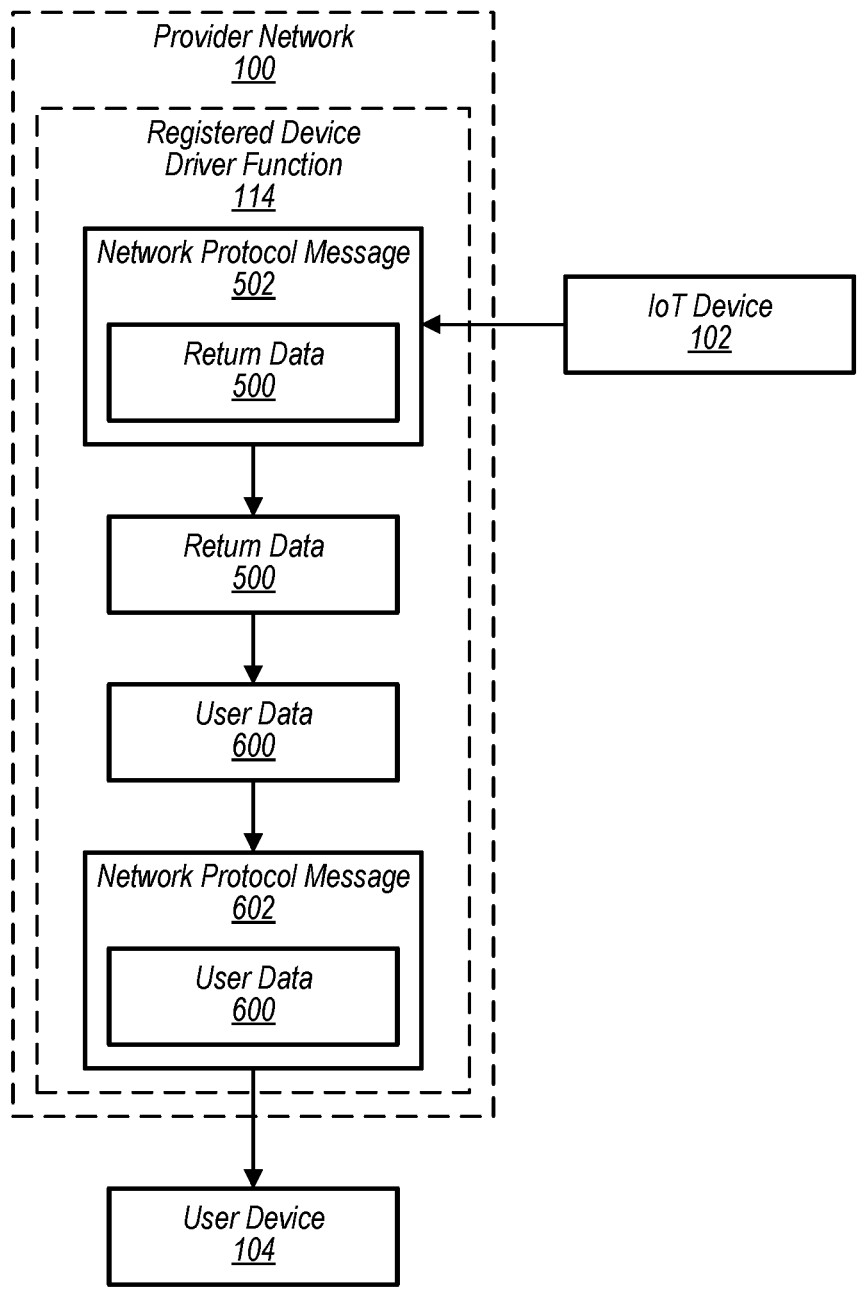
FIG. 6 is a logical block diagram of a registered device driver function that translates a network protocol message that includes return data into a network protocol message that includes user data for sending to a user device, according to some embodiments.

FIG. 6 is a logical block diagram of a registered device driver function that translates a network protocol message that includes return data into a network protocol message that includes user data for sending to a user device, according to some embodiments. In the depicted embodiment, an event-driven compute service of the provider network 100 receives a network protocol message 502 from an IoT device 102. The network protocol message 502 includes return data 500.

In response to determining that the network protocol message 502 matches a defined event to trigger a registered device driver function 114, the event-driven compute service may launch the registered device driver function 114. As shown, the registered device driver function 114 may receive the network protocol message 502 and parse the network protocol message 502 to obtain the return data 500. The registered device driver function 114 may then translate the return data 500 into user data 600 for a user device 104.

In embodiments, translating the return data 500 into the user data 600 may include modifying or formatting the return data 500 into a different format suitable for reading or consuming by a user of the user device 104. In some embodiments, the user data 600 is modified or translated into a format suitable for use by a software application executing on the user device 104. In some instances, the return data 500 does not need to be modified or formatted.

In some embodiments, the modification or translation of the return data 500 into the user data 600 may include performing any number of additional functions, steps, or iterations of translation. For example, a hierarchy of translator functions may be implemented to translate the return data 500 to intermediate states before finally generating the user data 600 for sending to the IoT device 102. For example, the return data 500 may include a binary payload of data, which may be translated by a translator function into an intermediate non-binary payload of data, which is translated by another translator function into the user data 600. In embodiments, one or more of the translator functions may be implemented by code within the registered driver function 114 and/or one or more of the translator functions may be implemented by a different registered driver function 114 that is called from the currently running registered device driver function.

In some embodiments, the registered device driver function 114 generates a network protocol message 602 than includes the user data 600. The registered device driver function 114 may then transmit, via an application-level network protocol (e.g., via the provider network 100 and/or the network 110), the network protocol message 602 to the user device 104. In various embodiments the application-level network protocol used for transmitting the network protocol message 502 may be the same or different than the application-level network protocol used for transmitting the network protocol message 602.

Figure 7:
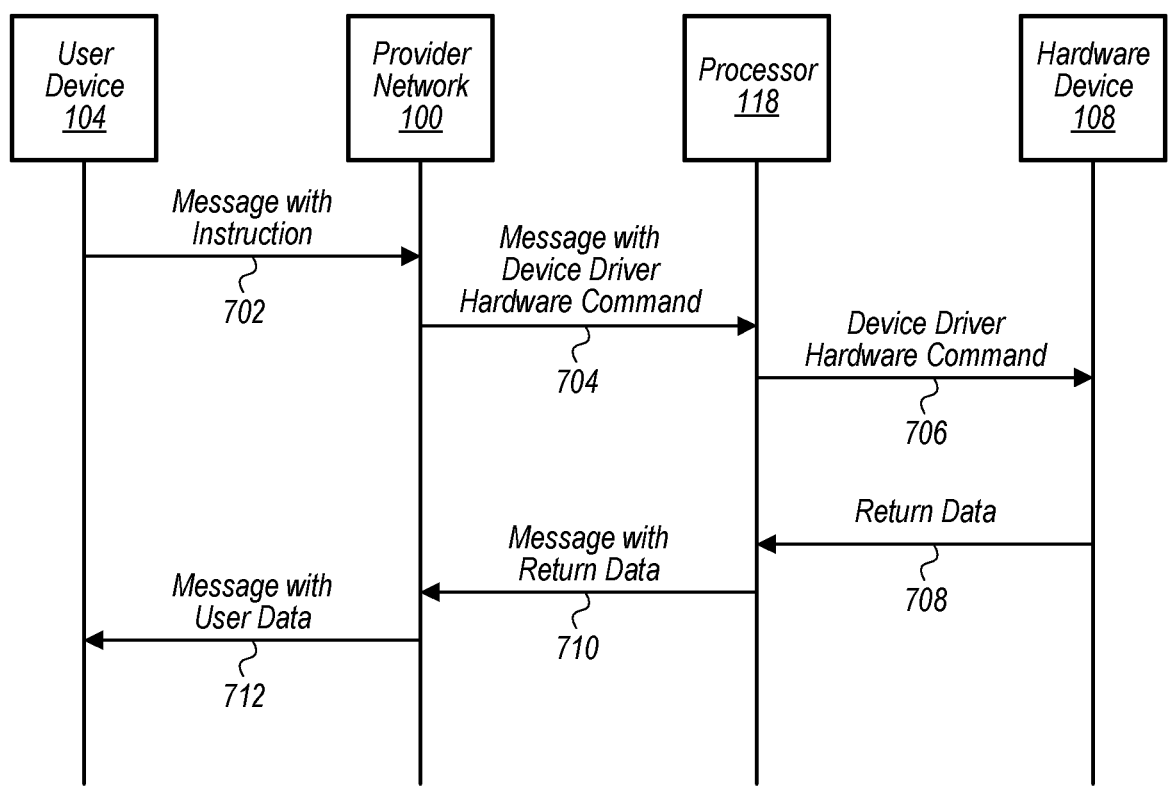
FIG. 7 is a flow diagram illustrating the flow of messages and data in a system for using remote device driver functions for IoT devices, according to some embodiments, according to some embodiments.

FIG. 7 is a flow diagram illustrating the flow of messages and data in a system for using remote device driver functions for IoT devices, according to some embodiments. At step 702, a user device 104 may transmit, via an application-level protocol, a network protocol message to an event-driven compute service of a provider network 100. In embodiments, the network protocol message may include an identifier for an IoT device and an instruction for the IoT device.

The provider network 100 receives the network protocol message from the user device 104 and translates the received message into another network protocol message that includes a device driver hardware command. At step 704, the provider network 100 transmits the other network protocol message to an IoT device, where the message is received by a processor 118 of the IoT device. The processor may parse the received message to obtain the device driver hardware command.

At step 706, the processor 118 may implement the device driver hardware command on the hardware device 108. As described above, the processor 118 may implement the device driver hardware command on the hardware device 108 via a communication bus and in accordance with a hardware communication protocol. At step 708, the hardware device 108 sends return data to the processor 118. As described above, in some embodiments, the return data may include low-level raw data (e.g., binary data). The processor 118 may generate a return network protocol message that includes the return data.

At step 710, the processor 118 may send the return network protocol message via an application-level network protocol to the event-driven compute service of a provider network 100. The provider network 100 receives the return network protocol message from the IoT device and translates the return network protocol message into another return network protocol message that includes user data to be sent to a user device 104. As described above, in some embodiments, the translation of the return data into the user data may include performing any number of additional functions, steps, or iterations of translation. At step 712, the event-driven compute service of the provider network 100 transmits the other return network protocol message to the user device 104. In embodiments, the user data may be parsed from the other return network protocol message and used by a software application and/or presented to a user.

Figure 8:
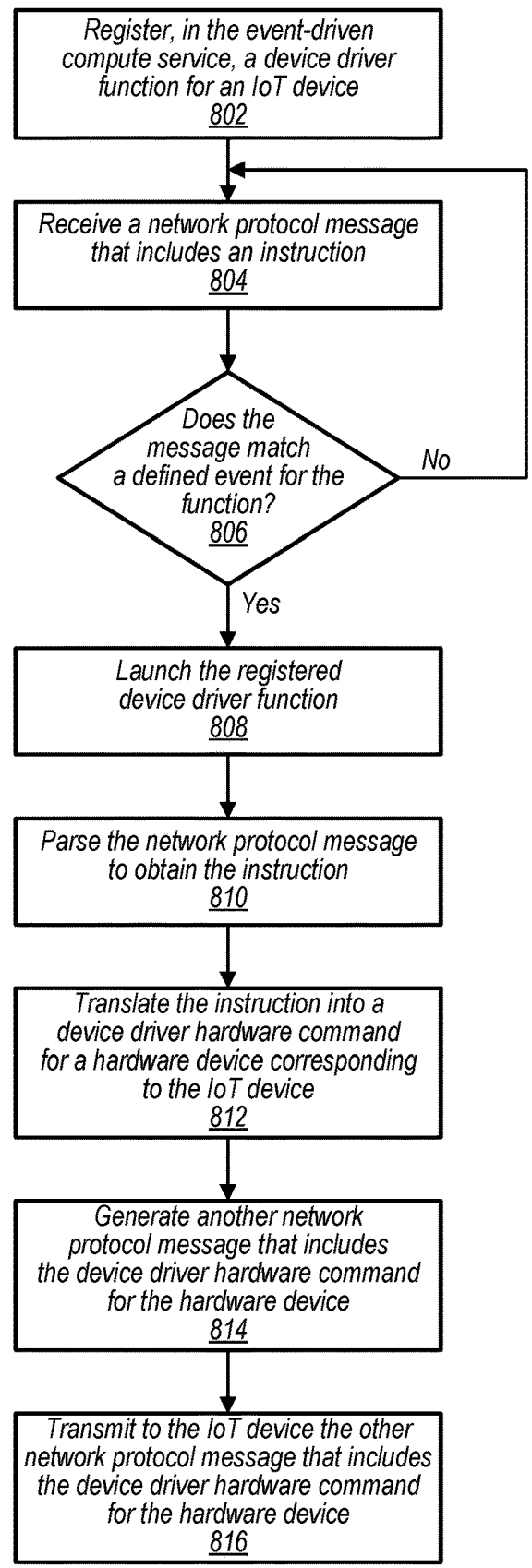
FIG. 8 is a flow diagram of a process for using a registered device driver function to translate a network protocol message that includes an instruction into another network protocol message that includes a device driver hardware command, and transmitting the other network protocol message to an IoT device, according to some embodiments.

FIG. 8 is a flow diagram of a process for using a registered device driver function to translate a network protocol message that includes an instruction into another network protocol message that includes a device driver hardware command, and transmitting the other network protocol message to an IoT device, according to some embodiments. At block 802, a user registers, in an event-driven compute service, a device driver function for the IoT device.

In some embodiments, before registering the IoT device or as a part of the registration process, the provider network (e.g., device driver assignment service) may determine whether the IoT device is capable of implementing one or more device driver hardware commands generated by the device driver function and if not, the device driver assignment service may indicate that the device driver function cannot be registered for the IoT device and the process may terminate. For example, the device driver assignment service may determine whether the version of the IoT device and/or processor of the IoT device and/or hardware device of the IoT device is a valid version for receiving and implementing one or more device driver hardware commands from the device driver function and if not, the device driver assignment service may indicate that the device driver function cannot be registered for the IoT device. However, if the device driver assignment service determines that the IoT device is capable of implementing one or more device driver hardware commands generated by the device driver function, then the process may proceed to block 804.

At block 804, the event-driven compute service receives a network protocol message that includes an instruction for an IoT device. In embodiments, the message may also include a unique identifier for the IoT device. At block 806, the event-driven compute service determines whether the received message matches a defined event to trigger the registered device driver function. If not, the process returns to block 806, where the event-driven compute service may receive another network protocol message at a later time.

If the event-driven compute service determines that the received message matches a defined event to trigger the registered device driver function, then at block 808, the event-driven compute service launches the registered device driver function. At block 810, the registered device driver function parses the received network protocol message to obtain an instruction from the message.

At block 812, the registered device driver function translates the instruction into a device driver hardware command for a hardware device corresponding to the IoT device. As described above, the translation may include a loop of one or more intermediate translation steps and/or functions. At block 814, the registered device driver function generates another network protocol message that includes the device driver hardware command for the hardware device. At block 816, the registered device driver function transmits to the IoT device the other network protocol message, which includes the device driver hardware command for the hardware device.

Figure 9:
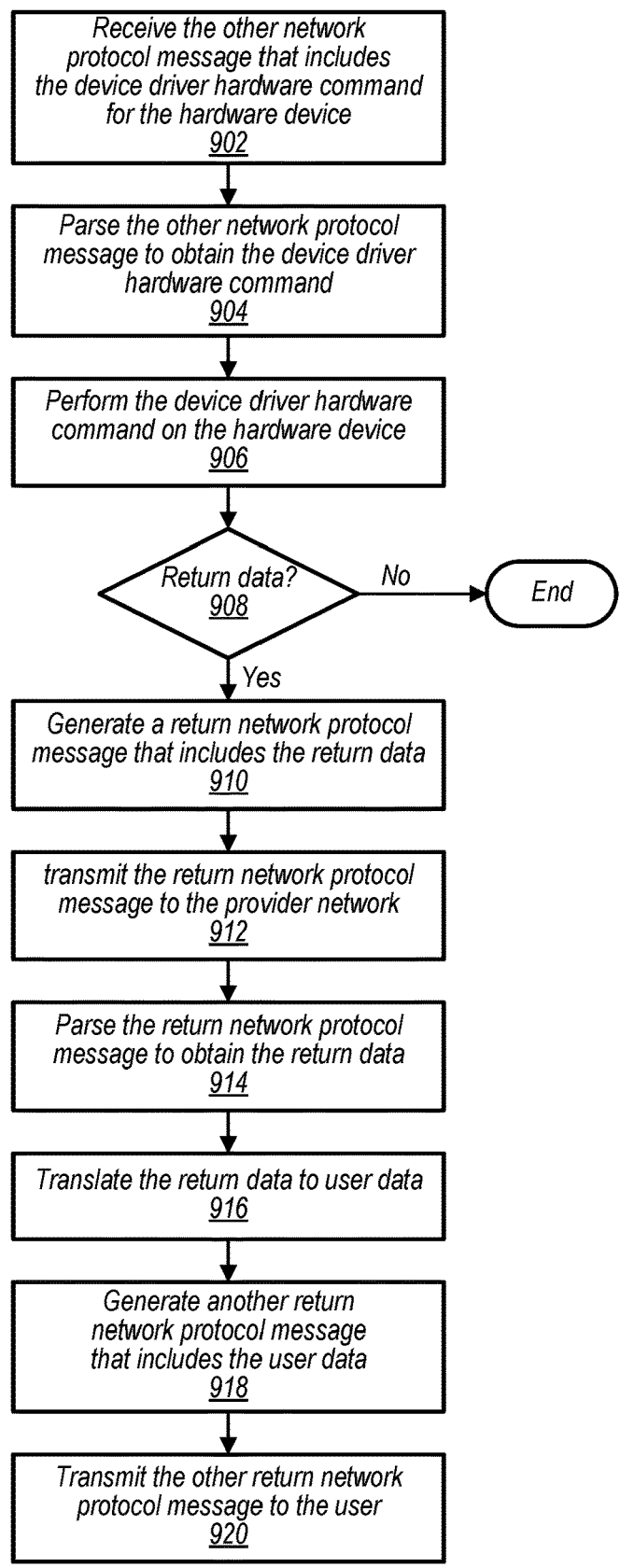
FIG. 9 is a flow diagram of a process for obtaining, by an IoT device, a device driver hardware command to perform on a hardware device, and sending return data back to a user, according to some embodiments.

FIG. 9 is a flow diagram of a process for obtaining, by an IoT device, a device driver hardware command to perform on a hardware device, and sending return data back to a user, according to some embodiments. At block 902, the IoT device receives the other network protocol message that includes the device driver hardware command for the hardware device.

At block 904, a hardware command parser of a processor of the IoT device parses the other network protocol message to obtain the device driver hardware command for the hardware device. At block 906, the processor performs and/or implements the device driver hardware command on the hardware device. In embodiments, the processor may transmit or send the command to the hardware device. At block 908, if there is not return data from the hardware device, then the process ends.

At block 908, if there is return data from the hardware device, then at block 910, the processor generates a return network protocol message that includes the return data. In embodiments, a message generator of the processor (e.g., application running in system memory) may generate the return network protocol message. At block 912, the IoT device transmits the return network protocol message to the provider network.

At block 914, the registered device driver function parses the return network protocol message to obtain the return data. In some embodiments, the event-driven compute service determines that the received return network protocol message matches a defined event and in response, launches the registered device driver function or another registered function to parse the message and obtain the return data. At block 916, the registered device driver function translates the return data into user data. As described above, the translation may include a loop of one or more intermediate translation steps and/or functions.

At block 918, the registered device driver function generates another return network protocol message that includes the user data. At block 920, the registered device driver function transmits to the user device (e.g., the user of the user device) the other return network protocol message, which includes the user data.

Figure 10:
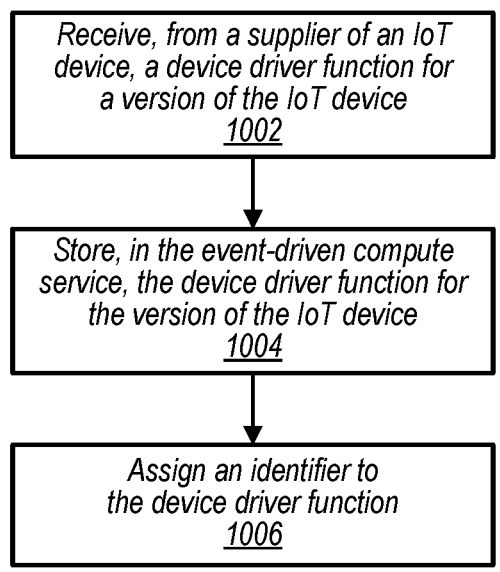
FIG. 10 is a flow diagram of a process for storing and configuring a new device driver function for an IoT device, according to some embodiments.

FIG. 10 is a flow diagram of a process for storing and configuring a new device driver function for an IoT device, according to some embodiments. At block 1002, a device driver upload service receives, from a supplier driver of an IoT device, a device driver function for a version of an IoT device. In embodiments, a particular IoT device provided by a supplier (e.g., a temperature sensing and reporting device) may be sold in multiple different versions to various users or customers. Thus, the device driver upload service may receive, from a supplier driver of an IoT device, device driver functions for different versions of a particular IoT device.

At block 1004, the device driver upload service stores, in the event-driven compute service, the device driver function for the version of the IoT device. At block 1006, the device driver upload service assigns an identifier to the device driver function. In embodiments, the identifier may be stored in association with the device driver function. In embodiments, the identifier may be selected by a user when the user registers the device driver function for a particular IoT device (e.g., using the device driver assignment service).

Figure 11:
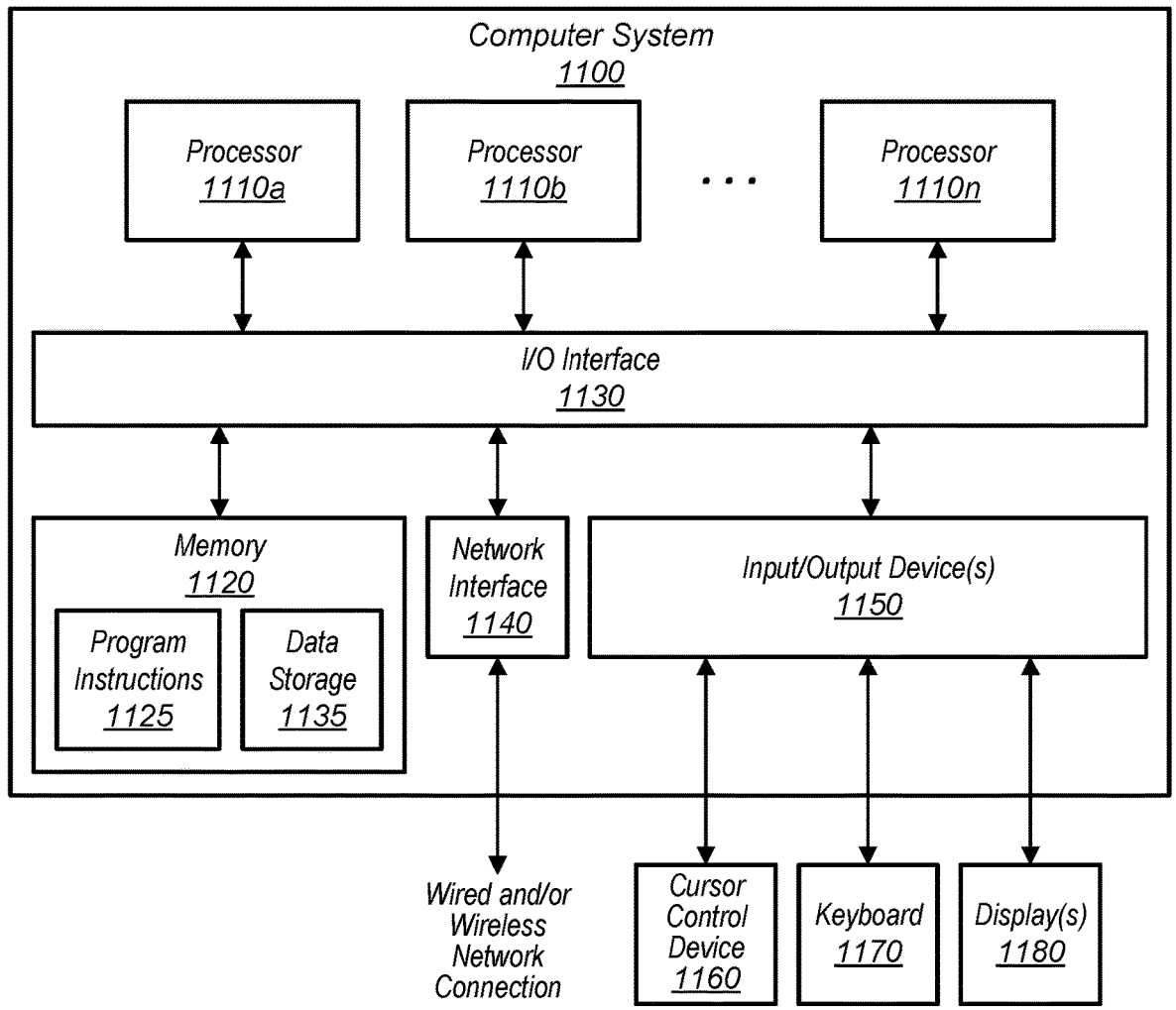
FIG. 11 is a block diagram illustrating an example computer system that implements some or all of the techniques described herein, according to some embodiments.

Any of various computer systems may be configured to implement processes associated with the provider network 100, IoT devices 102, and user devices 104 to implement remote device drivers. For example, FIG. 11 is a block diagram illustrating an example computer system that implements some or all of the techniques described herein, according to some embodiments. In various embodiments, the provider network 100, IoT devices 102, and user devices 104 may each include one or more computer systems 1100 such as that illustrated in FIG. 11. In embodiments, an IoT device, a user device, or any of the hosts or servers of the device driver upload service fleet, device driver assignment service fleet, and event-driven compute service fleet may include one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 1120 as program instructions 1125. In some embodiments, system memory 1120 may include data 1135 which may be configured as described herein (e.g., file objects, log objects, etc.).

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other computer systems 1100 or devices attached to a network, such as the network 110 or a local network within the provider network, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device 1160, keyboard 1170, or display(s) 1180 may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more processors; and
   one or more memories, wherein the one or more memories have stored thereon instructions, which when executed by the one or more processors, cause the one or more processors to:
      implement a device driver assignment service for a plurality of internet-connectable devices, wherein the device driver assignment service is configured to register, in an event-driven compute service, device driver functions for respective internet-connectable devices; and
      implement the event-driven compute service, wherein the event-driven compute service is configured to:
         receive a network protocol message comprising:
            an identifier for an internet-connectable device; and
            an instruction for the internet-connectable device; and
         in response to a determination that the network protocol message matches a defined event to trigger one of the registered device driver functions, launch the registered device driver function, wherein the registered device driver function is configured to:
            translate the instruction into a device driver hardware command for a hardware device corresponding to the internet-connectable device, wherein the device driver hardware command identifies one or more hardware resources of the internet-connectable device; and
            transmit, via an application-level network protocol, another network protocol message to the internet-connectable device, wherein the other network protocol message comprises the device driver hardware command for the hardware device corresponding to the internet-connectable device.

2. The system as recited in claim 1, wherein to register, in the event-driven compute service, a device driver function as the registered device driver function, the device driver assignment service is configured to:
   define events that trigger the registered device driver function in the event-driven compute service, wherein one or more of the events comprise receiving a given network protocol message that comprises at least the identifier for the internet-connectable device.

3. The system as recited in claim 1, wherein the one or more hardware resources of the internet-connectable device identified by the device driver hardware command comprise one or more pins corresponding to a processor of the internet-connectable device that are used to implement the device driver hardware command for the hardware device.

4. The system as recited in claim 3, wherein the event-driven compute service is configured to:
 receive a particular network protocol message comprising:
  another identifier for another internet-connectable device; and
  another instruction for the other internet-connectable device; and
 in response to a determination that the particular network protocol message matches a defined event to trigger another of the registered device driver functions, launch the other registered device driver function, wherein the other registered device driver function is configured to:
  translate the other instruction into another device driver hardware command for a different version of the hardware device corresponding to the other internet-connectable device, wherein the other device driver hardware command identifies one or more different pins corresponding to a same or different version of the processor of the internet-connectable device; and
  transmit to the other internet-connectable device another particular network protocol message comprising the other device driver hardware command for the different version of the hardware device corresponding to the other internet-connectable device.

5. The system as recited in claim 4, wherein the instructions cause the one or more processors to:
 implement a device driver upload service for a plurality of suppliers of the internet-connectable devices, wherein the device driver upload service is configured to store, in the event-driven compute service, device driver functions for one or more respective versions of the internet-connectable devices, and
 wherein the hardware device corresponds to a version of the internet-connectable device and the different version of the hardware device corresponds to a different version of the internet-connectable device.

6. A method, comprising:
 receiving, by a network-based service, a network protocol message comprising:
  an identifier for an internet-connectable device; and
  an instruction for the internet-connectable device;
 identifying a device driver function associated with the received network protocol message, wherein the device driver function is registered in the network-based service;
 executing the identified device driver function;
 translating, by the identified device driver function, the instruction into a device driver hardware command for a hardware device corresponding to the internet-connectable device, wherein the device driver hardware command identifies one or more hardware resources of the internet-connectable device; and
 transmitting, to the internet-connectable device, another network protocol message comprising the device driver hardware command for the hardware device corresponding to the internet-connectable device.

7. The method as recited in claim 6, wherein the one or more hardware resources of the internet-connectable device identified by the device driver hardware command comprise one or more pins corresponding to a processor of the internet-connectable device.

8. The method as recited in claim 7, wherein the device driver hardware command further identifies a hardware communication protocol to use with the hardware device.

9. The method as recited in claim 6, wherein the internet-connectable device does not have a device driver for translating the instruction into a hardware command for the hardware device.

10. The method as recited in claim 6, wherein the event-driven compute service transmits the network protocol message to the internet-connectable device via a message queue telemetry transport (MQTT) protocol or a hypertext transfer protocol (HTTP).

11. The method as recited in claim 6, further comprising:
 receiving, at a device driver upload service, device driver functions for one or more respective versions of the internet-connectable devices; and
 storing, in the network-based service, the device driver functions for the one or more respective versions of the internet-connectable devices.

12. The method as recited in claim 6, wherein the network-based service is an event-driven compute service, the method further comprising:
 receiving, at a device driver assignment service, a request to register the internet-connectable device, wherein the request includes identification data for the internet-connectable device;
 selecting a device driver function from a plurality of device driver functions based on the identification data; and
 registering the device driver function in the event-driven compute service as a registered device driver function for the internet-connectable device.

13. The method as recited in claim 12, wherein registering the device driver function comprises defining events that trigger the registered device driver function in the event-driven compute service, wherein one or more of the events comprise receiving a given network protocol message that comprises at least the identifier for the internet-connectable device.

14. A non-transitory computer-readable storage medium storing program instructions that, when executed by one or more computing devices of an event-driven compute service, causes the one or more computing devices to implement:
 receiving, by a network service, a network protocol message comprising:
  an identifier for an internet-connectable device; and
  an instruction for the internet-connectable device;
 identifying a device driver function associated with the received network protocol message, wherein the device driver function is registered in the network-based service;
 executing the identified device driver function;
 translating, by the identified device driver function, the instruction into a device driver hardware command for a hardware device corresponding to the internet-connectable device, wherein the device driver hardware command identifies one or more hardware resources of the internet-connectable device; and
 transmitting, to the internet-connectable device, another network protocol message comprising the device driver hardware command for the hardware device corresponding to the internet-connectable device.

15. The non-transitory, computer-readable storage medium of claim 14, wherein the one or more hardware resources of the internet-connectable device identified by the device driver hardware command comprise one or more pins corresponding to a processor of the internet-connectable device.

16. The non-transitory, computer-readable storage medium of claim 14, wherein the device driver hardware command further identifies a hardware communication protocol to use with the hardware device.

17. The non-transitory, computer-readable storage medium of claim 14, wherein the internet-connectable device does not have a device driver for translating the instruction into a hardware command for the hardware device.

18. The non-transitory, computer-readable storage medium of claim 14, wherein the program instructions cause the computing device to implement:
   storing, in the network-based service, device driver functions for respective versions of internet-connectable devices.

19. The non-transitory, computer-readable storage medium of claim 14, wherein the program instructions cause the computing device to implement:
   receiving, by the network-based service, a particular network protocol message comprising:
      another identifier for another internet-connectable device; and
      another instruction for the other internet-connectable device;
   identifying another device driver function associated with the particular network protocol message, wherein the other identified device driver function is registered in the network-based service;
   executing the other identified device driver function;
   translating, by the other identified device driver function, the other instruction into another device driver hardware command for another hardware device corresponding to the other internet-connectable device, wherein the other device driver hardware command identifies one or more other hardware resources of the other internet-connectable device; and
   transmitting, to the other internet-connectable device, another particular network protocol message comprising the other device driver hardware command for the other hardware device corresponding to the other internet-connectable device.

20. The non-transitory, computer-readable storage medium of claim 19, wherein:
   the one or more hardware resources of the internet-connectable device identified by the other device driver hardware command comprise one or more pins corresponding to a processor of the other internet-connectable device; and
   the one or more other hardware resources of the other internet-connectable device identified by the other device driver hardware command comprise one or more different pins corresponding to another processor of the other internet-connectable device, and wherein the number of the one or more pins is different than the number of the one or more different pins.

\* \* \* \* \*